United States Patent [19]

Richardson et al.

[11] Patent Number: 5,147,987

[45] Date of Patent: Sep. 15, 1992

[54] MUFFLER ASSEMBLY

[75] Inventors: Larry E. Richardson, Columbus; David W. Strickland, Elizabethtown; Frank L. Zagar, Seymour; Richard C. Wilcox, Columbus, all of Ind.

[73] Assignee: Arvin Industries, Inc., Columbus, Ind.

[21] Appl. No.: 544,408

[22] Filed: Jun. 27, 1990

Related U.S. Application Data

[63] Continuation-in-part of Ser. No. 345,141, Apr. 28, 1989, Pat. No. 4,941,545.

[51] Int. Cl.$^5$ .............................................. F01N 1/08
[52] U.S. Cl. ..................... 181/264; 181/272; 181/282
[58] Field of Search ............... 181/272, 282, 283, 276, 181/264, 281

[56] References Cited

U.S. PATENT DOCUMENTS

| | | | |
|---|---|---|---|
| Re. 33,370 | 10/1990 | Harwood | 181/282 |
| 3,638,756 | 2/1972 | Thiele | |
| 4,396,090 | 8/1983 | Wolfhugel | 181/282 |
| 4,456,091 | 6/1984 | Blanchot | 181/282 |
| 4,700,806 | 10/1987 | Harwood | 181/282 |
| 4,736,817 | 4/1988 | Harwood | 181/282 |
| 4,759,423 | 7/1988 | Harwood et al. | 181/282 |
| 4,760,894 | 8/1988 | Harwood et al. | 181/282 |
| 4,765,437 | 8/1988 | Harwood et al. | 181/282 |
| 4,821,840 | 4/1989 | Harwood et al. | 181/282 |
| 4,836,330 | 6/1989 | Harwood et al. | 181/282 |
| 4,865,154 | 9/1989 | Hanson et al. | 181/282 |
| 4,924,968 | 5/1990 | Moring et al. | 181/282 |
| 4,941,545 | 7/1990 | Wilcox et al. | 181/282 |
| 4,953,660 | 9/1990 | Jewell, Jr. et al. | 181/282 |

FOREIGN PATENT DOCUMENTS 59-43456 11/1981 Japan .
2120318 11/1983 United Kingdom .

*Primary Examiner*—L. T. Hix
*Assistant Examiner*—Khanh Dang
*Attorney, Agent, or Firm*—Barnes & Thornburg

[57] ABSTRACT

A muffler for reducing noise associated with exhaust systems includes an assembly of exhaust tubes and drop-in baffles fixed inside channels defined in a clamshell-type muffler chamber formed from two stamp-formed mating external shells.

18 Claims, 2 Drawing Sheets

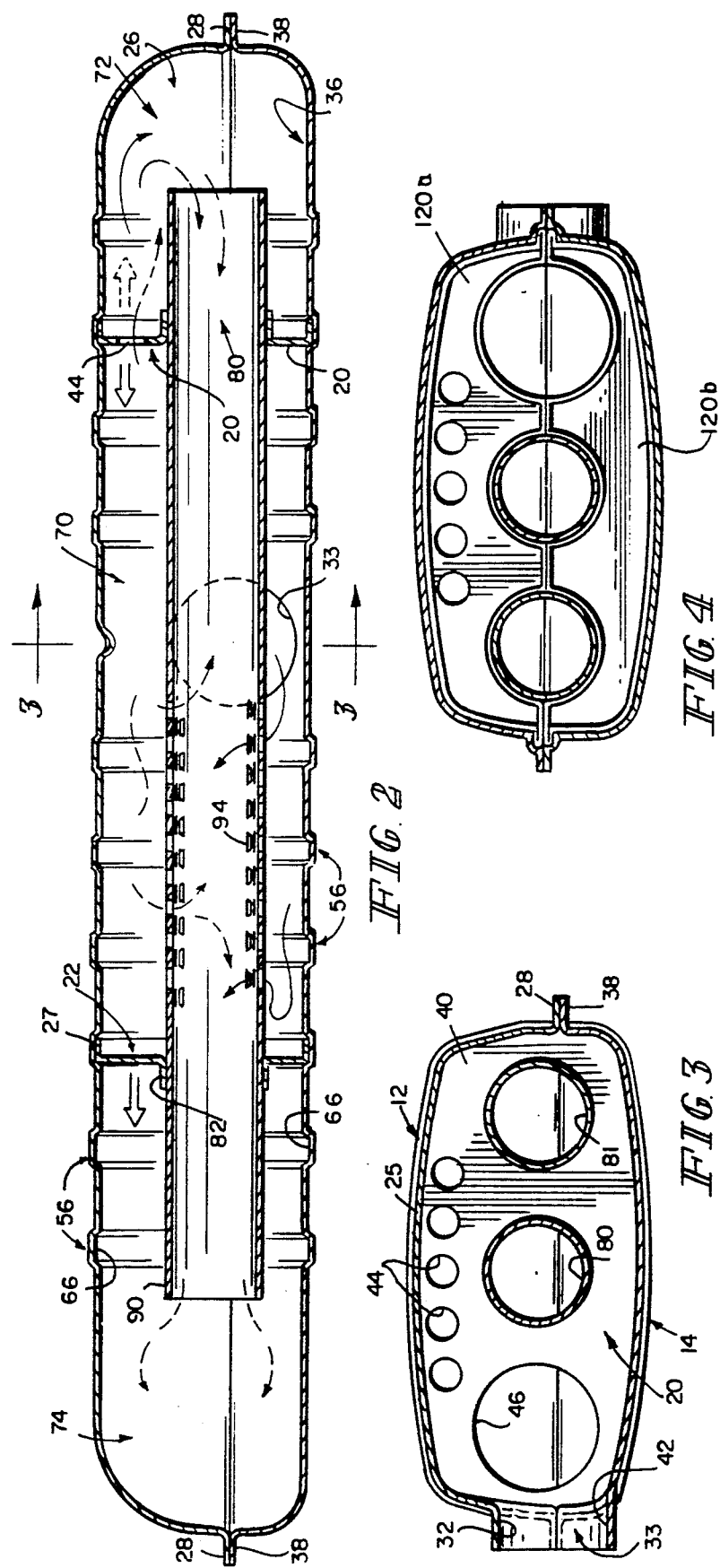

MUFFLER ASSEMBLY

BACKGROUND AND SUMMARY OF THE INVENTION

This application is a continuation-in-part application of co-pending Application Ser. No. 07/345,141, filed Apr. 28, 1989, now U.S. Pat. No. 4,941,545 which application is hereby incorporated herein by reference.

This invention relates to exhaust systems that include a muffler for controlling and reducing noise associated with engine exhaust gas. More particularly, this invention relates to a muffler having exhaust tubes and drop-in baffles fixed inside a muffler chamber formed by two mating external shells.

Mufflers can be constructed using stamp-formed sheet metal shells that define internal chambers and exhaust passageways. Although conventional stamped mufflers can be assembled using fewer component parts than conventional tube mufflers, it is nevertheless recognized that it is necessary to modify the design of conventional mufflers to improve the manufacturability of stamped mufflers. For example, it has been observed that weld process time for assembling conventional stamped mufflers is high and that it is often necessary to rely on costly, space-consuming, and labor-intensive welding equipment to attach conventional stamped muffler components together.

Another inherent difficulty associated with stamped mufflers arises because muffler vibration varies with operating conditions. Muffler vibration is generally associated with irregular pulsation of high-temperature, vehicle exhaust gas conveyed through the muffler chambers and passageways. Such pulsations are known to vary between 25 and 300 cycles per second in an irregular pattern and create muffler shell vibration and noise. Stamped mufflers are particularly susceptible to excessive shell noise problems due, in part, to resonant conditions created within the muffler chambers as exhaust gas flows through the muffler. Although it is possible to vary the positioning of internal baffles to eliminate these resonant acoustic modes in some types of muffler designs, it is generally not possible to vary internal chamber dimensions to eliminate resonant modes in mufflers made completely from stamped sheet metal. This means that stamped mufflers suitable for one type of automobile may be completely unsuitable for another type of automobile because the different engine exhaust Pressures and volumes causes unacceptably high noise output from the stamped muffler.

Therefore, one object of the present invention is to provide a hybrid muffler assembly made of both tubes and stamp-formed sheet metal components to reduce production costs and permit selection of interior baffle placement to minimize noise associated with vehicular exhaust.

Another object of the present invention is to provide a muffler assembly that is assembled using minimal or no weldment to hold chamber-defining baffles in place inside the interior region of the muffler assembly Yet another object of the present invention is to provide a hybrid muffler assembly that is easy and economical to manufacture and is constructed to reduce shell noise associated with vibration occurring during muffler use.

Still another object of the present invention is to provide a hybrid muffler assembly made both of rolled or extruded components such as conventional tubing and stamp-formed components which can be assembled quickly and easily without using costly complex welding techniques.

In accordance with the foregoing objectives a muffler assembly is provided that includes top and bottom stamp-formed shells. When the top and bottom shells are joined together they define a muffler chamber therebetween having an inlet and an outlet. Disposed within the muffler chamber are first and second drop-in baffles held in place within the muffler chamber by fitted insertion into indentations formed in the top and bottom stamp-formed shell. The indentations are arranged so that the muffler chamber is divided by the first and second drop-in baffles to define a first chamber, a second chamber, and a third chamber. The first and second drop-in baffles are formed to include a plurality of apertures therethrough, some of which support separate first and second exhaust tubes also disposed in the muffler chamber to pass through the first chamber and bridgeably interconnect the second and the third chambers in fluid communication.

In preferred embodiments, the indentations extend along the top and bottom shell halves to form a plurality of baffle-receiving channels opening into the muffler chamber. Each of the first and second drop-in baffles includes a top mounting edge insertably lodged in one of the baffle-receiving channels formed in the top stamp-formed shell half and a bottom mounting edge insertably lodged in one of the baffle-receiving channels formed in the bottom stamp-formed shell half. The muffler assembly can be formed to include a plurality of transverse external ribs aligned in spaced-apart relation and configured to provide the baffle-receiving channels opening into the muffler chamber as well as stiffen the muffler shell and reduce shell vibration.

An advantage of certain embodiments of the present invention is the savings in materials and manufacturing costs attributable to stamp-forming transverse ribs that structurally strengthen the muffler assembly as well as defining internal baffle receiving channels suitable for receiving and holding in place the drop-in baffles within the muffler chamber. The multiplicity of baffle receiving channels also allows placement of the baffles at varying distances from each other within the muffler chamber to inhibit resonance modes associated with particular engine types, exhaust volumes, or pressures. This allows muffler manufacturers to easily modify the acoustic properties of the muffler assembly by placing the baffles in any one of the baffle receiving channels so that engine noise is minimized.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 2 is a longitudinal sectional view of the muffler shown in FIG. 1 after assembly, taken along lines 2—2 and showing in order from left to right the third, first, and second chambers defined by the second drop-in baffle and the first drop-in baffle held in place by channels formed in the top and bottom shell halves;

FIG. 3 is a transverse sectional view taken along lines 3—3 of FIG. 2 showing the apertures defined by the second drop-in baffle; and FIG. 4 is a view similar to FIG. 3 showing an alternative embodiment in which half-sized baffles are used instead of full-sized baffles to partition the interior region of the muffler.

DETAILED DESCRIPTION OF THE DRAWINGS

Figure 1:
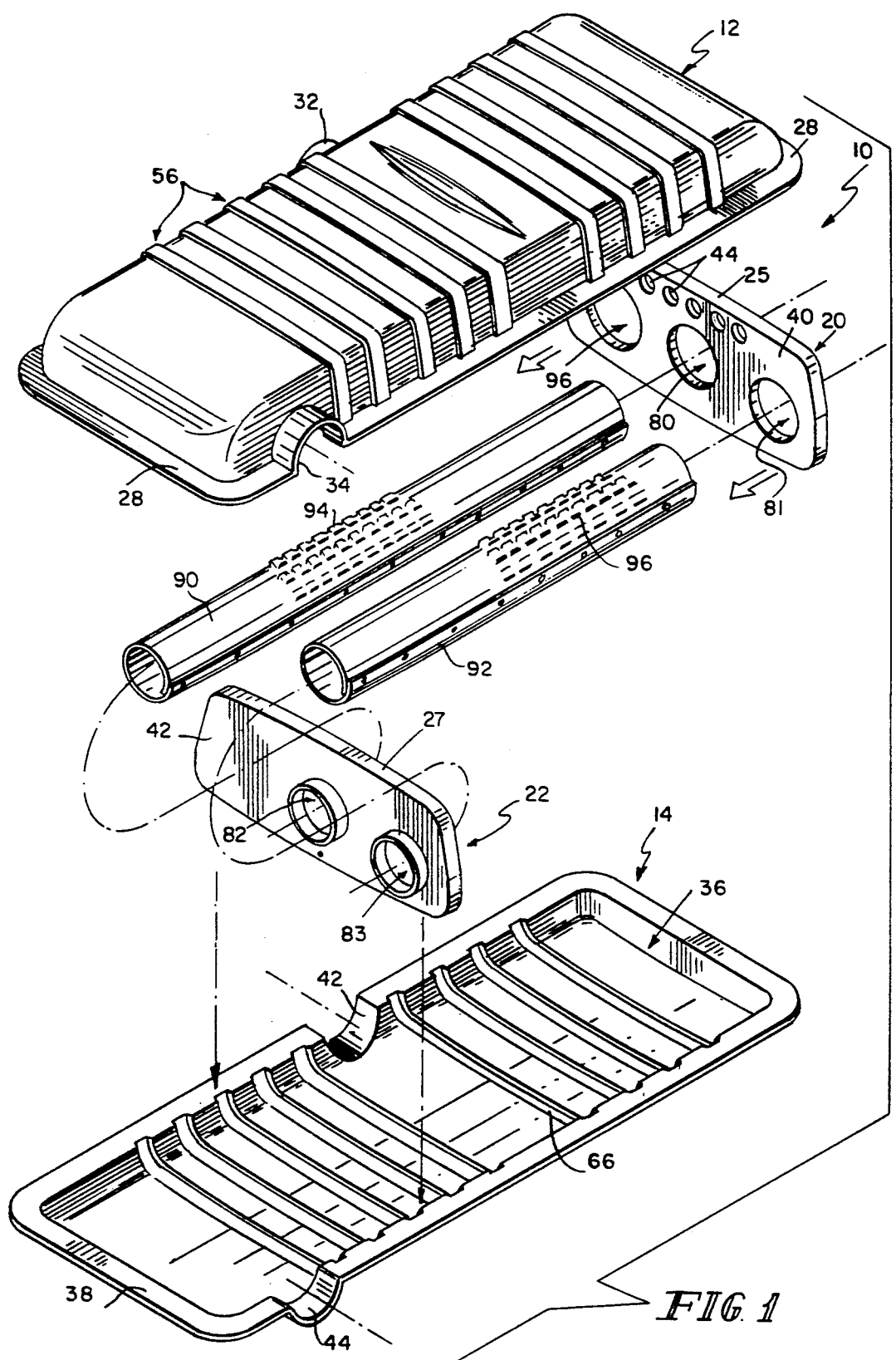
FIG. 1 is an exploded view showing assembly of a preferred embodiment of a muffler according to the present invention.

Muffler assembly 10 is formed to include a top shell half 12, a bottom shell half 14, a first drop-in baffle 20, and a second drop-in baffle 22. The baffles 20 and 22 are disposed between the top shell half 12 and the bottom shell half 14. In the illustrated embodiment, each of these components is stamp-formed sheet metal. For example, aluminized and non-aluminized cold-rolled steel or AISI/SAE grade 409 stainless steel are suitable for stamping to form the stamped components of muffler assembly 10.

As generally shown in FIGS. 1 and 2, top shell half 12 includes a hollowed basin 26 (shown in sectional view in FIG. 2) having a flat horizontal perimeter shelf 28 around the cavity provided by basin 26. The basin 26 is cut away as shown at 32 to provide an inlet opening into basin 26 and at 34 to provide an outlet exiting basin 26.

Bottom shell half 14 likewise includes a hollowed basin 36 and a flat horizontal perimeter shelf 38 surrounding the cavity provided by basin 36. The basin 36 is cut away as shown at 42 to provide an inlet opening into basin 36 and at 44 to provide an outlet exiting basin 36. The positioning of the cut away portions of basin 36 at 42 and 44 is selected to match the similar cut away portions 32 and 34 of basin 26 so that when the top shell 14 and the bottom shell 14 are brought together as shown in FIG. 2, a substantially cylindrical inlet aperture 33 (shown in FIGS. 2 and 3) and outlet aperture 35 are formed. The outlet aperture is not explicitly shown in an assembled state in the Figures, but consists of the aperture formed by the cutaways 34 and 44 when the top shell 12 is brought into contact with the bottom shell 14. These inlet and outlet apertures 33 and 35 are dimensioned to accept insertion of commercially available exhaust pipes in sealing attachment.

The basins 26, 36 in each of the top and bottom shell halves 12 and 14 include a plurality of spaced-apart transversely extending exterior ribs 56. The transverse ribs 56 are formed by stamp-pressing on an inner wall of basins 26, 36 to press enough material in an outward direction to form the ribs 56. These ribs 56 advantageously function to stiffen shell halves 12 and 14 against mechanical movement and also control shell noise which often occurs upon vibration of a muffler during use. Shell noise is lessened because the entire surface of each shell half 12 and 14 is made more rigid and therefore less prone to vibration.

The shell radii and corner curvature are also important features in preventing shell vibration during movement of exhaust gas through muffler assembly 10. As shown in FIGS. 1 and 3, each corner of the top and bottom shells 12, 14 is rounded and curved in such a way as to minimize noise resulting from rattle or vibration of those shells 12, 14.

The hybrid tube and baffle design of the present invention is an improvement over stamp-formed mufflers having stamp-formed rectangular internal plates arranged to extend across the space between the top and bottom shells. In many cases, these internal plates are formed to provide exhaust gas-conducting passageways when mated to one another. It has been observed that the large internal plates tend to deform and crack by thermal fatiguing as the muffler is used, and this fatiguing can lead to unwanted rattling of the internal plates. In the present invention, it is not necessary to use any of such stamp-formed internal plates because elongated hollow tubes are used to conduct exhaust gas flow between the various chambers or regions within the muffler assembly 10. Advantageously, shell noise is lessened in the present invention because such flow-conducting tubes do not undergo the same deformation and distortion due to thermal expansion as the above-described stamp-formed internal plates.

Stamp-forming the transverse ribs 56 also acts to form a plurality of indenting channels 66 in both the shell halves 12 and 14. These channels 66 are dimensioned to accept insertion of baffle edges 25 and 27 of the drop-in baffles 20 and 22, respectively. This construction advantageously allows for thermal expansion of the drop-in baffles 20, 22 as they are exposed to hot exhaust gases traveling through muffler assembly 10, thereby minimizing noise and uncoupling problems often associated with deformation of metal parts undergoing thermal expansion.

As best shown in FIG. 2, the drop-in baffles 20 and 22 can be inserted into any one of the plurality of channels 66 to define (in conjunction with the shell halves 12 and 14) a first chamber 70 positioned to lie between a second chamber 72 and a third chamber 74. In the embodiment shown in the Figures, the inlet 33 for vehicular exhaust gases (exhaust gas movement indicated by arrows in FIG. 2) opens into the first chamber 70 and the outlet 35 provides an exit for exhaust gases from the third chamber 74.

The baffles 20 and 22 are usually stamp-formed from sheet metal. As with the muffler shells 12 and 14, the baffles 20 and 22 can be formed from aluminized and non-aluminized cold-rolled steel or AISI/SAE grade 409 stainless steel. Each of the first and second drop-in baffles 20, 22 is respectively stamped to form a flat vertical wall 40 and 42. The first drop-in baffle 20 also includes a field of perforations 44 defined in the vertical wall 40 which allow fluid communication between the first chamber 70 and the second chamber 72. The perforations 44 allow exhaust gas in the first chamber 70 to travel to the second chamber 72 and also act to permit attenuation of a broader range of acoustic frequencies than is possible if the first and second chambers 70 and 72 did not have such a field of perforations 44. In addition to these perforations 44, the vertical wall 40 of the drop-in baffle 20 is formed to include an aperture 46 having real dimensions comparable to that of the areal dimensions of the inlet aperture 33. Exhaust gases entering the first chamber 70 from the inlet aperture 33 can flow through the aperture 46 into the second chamber 72.

Both the baffles 20 and 22 also respectively define apertures 80 and 81 (through baffle 20) and apertures 82 and 83 (through baffle 22). These apertures 80, 81, 82, and 83 generally have similar dimensions and are sized to accept insertion therethrough of commercially available tubing. As shown in FIG. 1, a first exhaust flow tube 90 is configured to pass through the apertures 80 and 82 of baffles 20 and 22, and a second exhaust flow tube 92 is configured to pass through the apertures 81 and 83 of the baffles 20 and 22. In the embodiment shown in the Figures, the apertures 80, 82 and 81, 83 are respectively aligned so that straight sections of flow tubes 90 and 92 can pass therebetween.

The flow tubes 90 and 92 can be constructed from commercially available steel tubing produced by either extrusion or roll-forming. In the embodiment shown in the Figures, the tubes 90 and 92 are formed from rolled steel that is spot welded to fix its tubular shape. The flow tubes 90 and 92 are cut from such tube stock to have a longitudinally extending length sufficient to bridge the first chamber 70, permitting fluid communication between the second chamber 72 and the third chamber 74 via the flow tubes 90 and 92. The flow tubes 90 and 92 can optionally be equipped with louver sections 94 and 96 to permit transfer of exhaust gasses between the tubes 90 and 92 and the first chamber 70.

Assembly of the muffler 10 shown in FIG. 1 begins with the insertion of the tube 90 into both the apertures 80 and 82 of the drop-in baffles 20 and 22. This procedure is similarly repeated to place tube 92 in a position passing through apertures 81 and 83 of the baffles 20 and 22. The tubes 90 and 92 are then spot welded or otherwise permanently attached to the baffles 20 and 22 so that the vertical walls 40 and 42 of the baffles 20, 22 are held in a parallel, spaced apart relationship to each other. The spacing is selected to correspond to some distance between pairs of channels 66. This arrangement allows ready modification of the volume of the first, second, or third chambers 70, 72, or 74 by appropriately selecting different distances between the vertical walls 40 and 42, allowing one to select the best combination of chamber sizes to attenuate noise produced by particular vehicle types.

After the baffles 20 and 22 and the tubes 90 and 92 have been attached to each other, the baffles 90 and 92, along with the attached tubes 90 and 92, are then dropped into place into the basin 36 of the lower shell 14 so that the baffle edges 25 and 27 are inserted into the channels 66. The top shell 14 is then placed atop the bottom shell 14 so that the shelf 28 matches the shelf 38 in abutting relationship, and the baffle edges 25 and 27 insertably fit into the channels 66 stamped into the top shell 12. Assembly of the muffler 10 is completed by welding or other permanent attachment of the shelf 28 to the shelf 38.

Although the illustrated muffler assembly 10 is shown to include only two baffles 20, 22, it will be understood that a muffler assembly in accordance with the present invention can include one or more baffles, as needed, to partition the interior region of the muffler assembly into the proper number of interior chambers. Although the illustrated muffler assembly 10 includes three interior chambers, an assembly can include two or more interior chambers.

It is within the scope of the present invention to use half baffles 120a, 120b of the type shown, for example, in FIG. 4 instead of the full size baffles 20, 22 shown in the embodiment of FIGS. 1-3. As shown in FIG. 4, each half baffle 120a, b includes a pair of peripheral mounting flanges 125 at its opposite ends. These mounting flanges 125 are configured to extend into the space provided between the shelves 28, 38 of the top and bottom shells 12, 14 during assembly of the muffler. Once the top and bottom shells 12, 14 are connected to one another, the mounting flanges 125 are trapped between the shelves 28, 38 to hold the half baffles 120a, b in a stable, fixed position within the interior region of the muffler assembly. Of course, each half baffle 120a, b can also be fit into an indentation formed in either the top or bottom shell 12, 14 as required to locate said half baffle 120a, b in a selected position within the muffler assembly. Reference is hereby made to U.S. Application Ser. No. 07/345,141, filed Apr. 18, 1989, for a description of half baffles suitable for use in connection with the present invention.

In one possible embodiment, a line of small exterior-opening, baffle-access apertures (not shown) is formed in each shell half in each transverse rib 56 which is designated to receive a baffle in its companion transverse channel 66 so that the drop-in baffle 20, 22 can be welded to the abutting top shell 12 through such baffle-access apertures once the muffler unit 10 is essentially fully assembled. Advantageously, the transverse channels 66 function as welding fixtures to hold the drop-in baffles 20, 22 in a selected position and orientation with respect to the abutting shell half during assembly and welding.

In operation, the muffler assembly 10 will be typically mounted in a horizontal orientation as shown in FIG. 2. Exhaust gasses from the engine of a vehicle (not shown) or other combustion engine enter the muffler 10 through the inlet 33, initially passing into the first chamber 70. A major portion of the exhaust gasses pass through aperture 46 into the second chamber 72, with minor amounts passing into the second chamber 72 through apertures in the field of perforations 44. The exhaust gasses turn-around in chamber 72 to pass through tubes 90 and 92 into the third chamber 74. Although some small portion of the exhaust gasses can escape from the tubes 90 and 92 through louvers 94 and 96 back into the first chamber 70, substantial amounts of exhaust gasses are transferred into the third chamber 74, whereupon they are released from the muffler 10 through the outlet 35. During this passage, the noise associated with exhaust is attenuated, and resonant frequencies are suppressed by the design of the chambers 70, 72 and 74.

Although the invention has been described in detail with reference to certain preferred embodiments, variations, and modifications exist within the scope and spirit of the invention as described and defined in the following claims.

What is claimed is:

1. A muffler assembly comprising top and bottom stamp-formed shell halves having a plurality of indentations, the shell halves being joined together to define a muffler chamber therebetween having an inlet and outlet, first and second drop-in baffles disposed in the muffler chamber to partition the muffler chamber into first, second, and third chambers therein, with the second and third chambers formed to lie at opposite ends of the muffler chamber positioning the first chamber therebetween, and the first and second drop-in baffles being held in place within the muffler chamber by fitted insertion into the indentations opening into the muffler chamber, with each baffle being formed to include a plurality of apertures extending therethrough, and separate first and second exhaust tubes disposed in the muffler chamber and arranged in spaced-apart relation to bridge the first chamber and extend through an aperture formed in each of the first and second drop-in baffles to interconnect the spaced-apart second and third chambers in fluid communication.

2. The muffler assembly of claim 1, wherein each of the top and bottom stamp-formed shell halves has indentations defining a plurality of baffle-receiving channels opening into the muffler chamber and each of the first and second drop-in baffles includes a top mounting edge lodged in one of the baffle-receiving channels formed in the top stamp-formed shell half and a bottom mounting edge lodged in one of the baffle-receiving channels formed in the bottom stamp-formed shell half.

3. The muffler assembly of claim 2, wherein each shell half includes a plurality of transverse external ribs aligned in spaced-apart relation and configured to provide the baffle-receiving channels opening into the muffler chamber.

4. The muffler assembly of claim 1, wherein the first drop-in baffle is formed to include first, second, and third apertures arranged in sequence in a horizontally extending row, the first aperture is open to permit flow of exhaust gas between the first and second chambers, the first exhaust tube extends through the second aperture and fits snugly therein, and the second exhaust tube extends through the third aperture and fits snugly therein.

5. The muffler assembly of claim 1, wherein the first drop-in baffle is formed to include a plurality of perforations lying between said horizontally extending row of apertures and one of the shell halves to provide means for conducting exhaust gas between the first and second chambers in addition to the first aperture to enhance performance tuning of the muffler assembly.

6. The muffler assembly of claim 1, wherein at least one of the first and second exhaust tubes have a side wall formed to include a plurality of exhaust openings in the first chamber.

7. The muffler assembly of claim 6, wherein the inlet is positioned to open into the first chamber and the outlet is positioned to open into the second chamber.

8. The muffler assembly of claim 1, wherein each of the first and second exhaust tubes is an elongated, generally cylindrical, tubular member having one end disposed in the second chamber and an opposite end disposed in the third chamber.

9. The muffler assembly of claim 1, wherein each of the first and second shell halves includes a plurality of external ribs configured to provide the baffle-receiving channels.

10. A clamshell-type muffler assembly, comprising
a pair of stamp-formed outer shells which are joined together to define a muffler chamber therebetween having an inlet and outlet, and
a subassembly of elongated exhaust tubes and stamp-formed baffles disposed in the muffler chamber and configured to guide the flow of exhaust product through the muffler chamber between the inlet and outlet, the stamp-formed baffles being arranged to partition the muffler chamber into a plurality of smaller chambers, the elongated exhaust tubes passing through apertures formed in the stamp-formed baffles to conduct exhaust product between at least two of said smaller chambers, each of the stamp-formed outer shells being formed to include a plurality of spaced-apart baffle-receiving channels opening into the muffler chamber and each of the stamp-formed baffles including a first mounting edge lodged in one of the stamp-formed outer shells and a second mounting edge lodged in a selected baffle-receiving channel formed in the other of the stamp-formed outer shells.

11. The muffler assembly of claim 10, wherein each outer shell includes a plurality of transverse external ribs configured to provide the baffle-receiving channels into the muffler chamber.

12. The muffler assembly of claim 10, wherein the exhaust tubes are arranged to lie in spaced-apart parallel relation and extend between a pair of spaced-apart, stamp-formed baffles having mounting edges lodged in the baffle-receiving channels.

13. A muffler assembly comprising
a first shell half,
a second shell half attached to the first shell half at a perimetrically extending split line to define a muffler chamber therebetween, an inlet port for admitting exhaust gas into the muffler chamber, and an outlet port for expelling exhaust gas from the muffler chamber, each of the first and second shell halves being formed to include a plurality of baffle-receiving channels opening into the muffler chamber,
means for partitioning the muffler chamber to define at least first, second, and third chambers therein, partitioning means including a first drop-in baffle extending into baffle-receiving channels formed in each of the first and second shell halves and interconnecting the first and second halves to provide a partition between the first and second chambers, the first drop-in baffle being formed to include a plurality of apertures extending therethrough, a second drop-in baffle extending into baffle-receiving channels formed in each of the first and second shell halves and interconnecting the first and second shell halves to provide a partition between the first and third chambers, the second drop-in baffle being formed to include at least two apertures extending therethrough, the first and second drop-in baffles lying in spaced-apart relation to define the first chamber therebetween and position the inlet port in communication with the first chamber and the outlet port in communication with the third chamber,
a first elongated exhaust tube extending through an aperture formed in each of the first and second drop-in baffles to interconnect the second and third chambers in fluid communication, and
a second elongated exhaust tube extending through an aperture formed in each of the first and second drop-in baffles to interconnect the second and third chambers in fluid communication.

14. The muffler assembly of claim 13, wherein the first drop-in baffle is formed to include first, second, and third apertures arranged in sequence in a horizontally extending row, the first aperture is open to permit flow of exhaust gas between the first and second chambers, the first exhaust tube extends through the second aperture and fits snugly therein, and the second exhaust tube extends through the third aperture and fits snugly therein.

15. The muffler assembly of claim 13, wherein the first drop-in baffle is formed to include a plurality of perforations lying between said horizontally extending row of apertures and one of the shell halves to provide means for conducting exhaust gas between the first and second chambers in addition to the first aperture to enhance performance tuning of the muffler assembly.

16. The muffler assembly of claim 13, wherein at least one of the first and second exhaust tubes have a side wall formed to include a plurality of exhaust openings in the first chamber.

17. The muffler assembly of claim 13, wherein each of the first and second exhaust tubes is an elongated, generally cylindrical, tubular member having one end disposed in the second chamber and an opposite end disposed in the third chamber.

18. The muffler assembly of claim 13, wherein each of the first and second shell halves includes a plurality of external ribs configured to provide the baffle-receiving channels.

* * * * *